(12) United States Patent
Lund et al.

(10) Patent No.: US 7,463,651 B2
(45) Date of Patent: Dec. 9, 2008

(54) METHOD AND SYSTEM FOR EXPLOITING SPARE LINK BANDWIDTH IN A MULTILANE COMMUNICATION CHANNEL

(75) Inventors: Martin Lund, Menlo Park, CA (US); Howard Baumer, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 910 days.

(21) Appl. No.: 10/454,012

(22) Filed: Jun. 4, 2003

(65) Prior Publication Data

US 2004/0156314 A1  Aug. 12, 2004

Related U.S. Application Data

(60) Provisional application No. 60/463,000, filed on Apr. 15, 2003, provisional application No. 60/448,703, filed on Feb. 18, 2003, provisional application No. 60/446,894, filed on Feb. 12, 2003.

(51) Int. Cl.
*H04J 3/00* (2006.01)
(52) U.S. Cl. .......................... 370/476; 370/524; 375/308
(58) Field of Classification Search ................. 370/338, 370/230, 464; 341/110; 704/229; 241/59; 714/758; 455/67.13; 375/141, 220, 354, 375/308
See application file for complete search history.

(56) References Cited

U.S. PATENT DOCUMENTS

| 5,598,442 | A | 1/1997 | Capowski et al. |
| 5,930,252 | A * | 7/1999 | Aaker et al. ............. 370/395.2 |
| 7,089,485 | B2 * | 8/2006 | Azadet et al. ............... 714/798 |
| 2004/0047434 | A1 * | 3/2004 | Waltho ........................ 375/308 |
| 2004/0091029 | A1 * | 5/2004 | Weiner et al. ................ 375/220 |

OTHER PUBLICATIONS

"10-Gogabit Ethernet Takes on Sonet" EDN Electrical Design News, Cahners Publishing Company, Newton, Massachusetts, US, vol. 46, No. 14 Jun. 21, 2001, pp. 81-81, 84, 86, XP001162653 ISSN: 0012-7515.

* cited by examiner

*Primary Examiner*—Seema S. Rao
*Assistant Examiner*—Wanda Z Russell
(74) *Attorney, Agent, or Firm*—McAndrews, Held & Malloy, Ltd.

(57) ABSTRACT

Aspects of the invention may include a method for encoding data in a multilane communication channel. The method may include generating from existing control characters in a character set, an expanded control character which may be utilized for controlling data in each lane of the multilane communication channel. The expanded control character may utilize spare link bandwidth. At least one of the lanes may be controlled using at least one of the generated existing control characters. If a first control character is an alignment character, a second control character may be selected from any other existing control characters. The first control character may be combined with the second control character to generate a third control character. Each of the combinations of the first and second control characters may represent an expanded control character. The existing control characters may be a configuration character, an idle character or an encapsulation character.

27 Claims, 8 Drawing Sheets

US 7,463,651 B2

METHOD AND SYSTEM FOR EXPLOITING SPARE LINK BANDWIDTH IN A MULTILANE COMMUNICATION CHANNEL

CROSS-REFERENCE TO RELATED APPLICATIONS/INCORPORATION BY REFERENCE

This application makes reference to, claims priority to, and claims the benefit of:

U.S. Provisional Application Ser. No. 60/448,703 filed Feb. 18, 2003;

U.S. Provisional Application Ser. No. 60/463,000 filed Apr. 15, 2003; and

U.S. Provisional Application Ser. No. 60/446,894 filed Feb. 12, 2003.

The above stated applications are incorporated herein by reference in their entirety.

FIELD OF THE INVENTION

Certain embodiments of the invention relate to encoding of information. More specifically, certain embodiments of the invention relate to a method and system for encoding information to exploit spare link bandwidth in a multilane communication channel.

BACKGROUND OF THE INVENTION

Data communication between two link partners or entities in a digital communication system may be accomplished according to the general configuration of FIG. 1. FIG. 1 is a diagram illustrating an embodiment of an existing multilane digital communication link. Referring to FIG. 1, there is shown a digital communication link 100, which may include transmitter side 101 and a receiver side 102. The transmitter side 101 may include a multi-lane encoder 103, a high-speed serializer 104 and a modulator 105. The receiver side 102 may include a demodulator 106, a high-speed de-serializer 107, and a multi-lane decoder 108. The transmitter side 101 and the receiver side 102 may be coupled by a link infrastructure 110. Alternatively, the link infrastructure 110 may be a loop-back path. Notwithstanding, the link infrastructure may be, for example, a shielded twisted pair, an unshielded twisted pair (UTP), copper wire or optical fiber.

Typically, the multi-lane encoder 103 may accept raw data bytes from an upstream component of the digital communication system and encode the raw data bytes into a plurality of n parallel lanes 111a of coded words. The coded words may be specially designed to provide reliable transmission over the digital communication link 100. For example, standardized coding such as 4B5B or 8B10B coding may be utilized to ensure reliable transmission.

Once the raw bytes of data have been encoded, the resulting coded data may be multiplexed into a serial bit stream 109a by the high-speed serializer 104. The serial bit stream 109a may be transferred to the modulator 105 for processing. The modulator 105 may perform digital-to-analog conversion on the serial bit stream 109a, resulting in an analog equivalent bitstream 109b. The resulting analog serial bitstream 109b may be transferred to the receiver side 102 via the link infrastructure or loopback 110.

Once the analog serial bitstream 109b reaches the demodulator 106 on the receiver side 102, the demodulator 106 may perform an analog-to-digital conversion on the serial bit stream 109b, resulting in a serial digital bitstream 109c. The resulting serial digital bitstream 109c generated by the demodulator 106 may be transferred to the high-speed de-serializer 107. The de-serializer 107 may perform the opposite function of the serializer 104 and may translate the serial digital bitstream 109c back into a plurality of n parallel lanes 111b. The n parallel lanes 111b of data are then passed to the multi-lane decoder 108, which essentially performs the opposite function of the encoder 103 and translates the parallel lanes back into raw data bytes.

An example of a multi-lane protocol interface is a 10 Gigabit Attachment Unit Interface (XAUI). XAUI is a full duplex interface that may utilize four data lanes to achieve throughput of 10 gigabits per second. Each data lane may operate in parallel at speed of 3.125 gigabits per second to accommodate data and associated overhead which is generated by the 8B/10B coding that is utilized. The resulting data rate is therefore 10 gigabits per second.

FIG. 2 is a diagram that illustrates an example of a XAUI parallel lane structure 200 for 10 gigabit (10 G) BASE-X operation comprising four lanes. Referring to FIG. 2, the XAUI parallel lane structure 200 may include a first lane (lane 0), a second lane (lane 1), a third lane (lane 2) and a fourth lane (lane 3). The XAUI parallel lane structure 200 depicts the end of a first data packet 201, an inter-packet-gap (IPG) or idle 202 and a first portion of a second data packet 203.

The data word bytes in the data packets may be designated by /D/. The end-of-packet (EOP) word may be designated by the control character /T/ and may indicate the end of a data packet. The SOP (start-of-packet) word may be designated by the control character /S/ and may indicate the start of a data packet. The control character /K/ may indicate a comma and may be utilized for byte alignment. The control character /A/ may be utilized to indicate an alignment character that may used for lane alignment. The control character /R/ may indicate a carrier extend and may be utilized to separate packets within a burst of packets. In certain instances, the control character /R may be utilized for code-group alignment. In this regard, the control character /R/ may be used to ensure proper code-group alignment of a first idle character occurring after a packet has been transmitted. The IPG or idle packet 202 preferably includes control characters such as /A/, /K/, and /R/. Consequently, the IPG or idle packet 202 does not include data characters.

The various control characters in each of the parallel lanes, lane 0, lane 1, lane 2 and lane 3 may be part of the transmission protocol utilized by standardized 10 G BASE-X transmission. In accordance with current 10 G standards and protocols, there are 12 control characters or special code groups.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the invention include a method for encoding data in a multilane communication channel. The method may include generating from existing control characters in a character set, expanded control characters utilized for controlling the data in each lane of the multilane communication channel. At least one of the lanes of the multilane communication channel may be controlled using at least one of the generated control characters. The method may further include selecting a second control character from any other existing control characters if a first control character of the existing control characters is an alignment character. The first control character may be combined with the second control character to generate a third control character. Each of the combination of the combined first control character and the second control character may represent an expanded control character. A first logic level may be assigned to the first control character and a second logic level assigned to the second control character. The first logic level or the second logic level may be one of logic zero (0) and logic (1).

If a first control character of the existing control characters is a start-of-packet control character, a second control character may be selected from any other existing control character in a control character set. A start of a packet may be indicated using the selected second control character. The second control character may be placed in a first lane of the multilane communication channel.

Another aspect of the invention may include determining which lane of the multilane communication channel contains an end-of-packet control character. If the end-of-packet control character is preceded by at least one control character in a lane of the multilane communication channel, then at least one other control character may be selected from the existing control character set. The other selected control character may be an end-of-packet control character. If the end-of-packet control character is succeeded by at least one comma control character in a lane of the multilane communication channel, then at least one other control character may be selected from the existing control character set. The selected character may be encoded as a comma control character. The method may further include generating combinations of the other encoded control character and assigning a unique value to each of the generated combinations. Each of the unique values may represent an expanded control character.

In another embodiment of the invention, at least one lane having an inter-packet-gap control character may be located. Any combination of control characters may be selected from an existing control character set. A column of the multilane communication channel corresponding to at least one lane with the inter-packet-gap may be encoded with any combination of the control characters. At least one column bearing data, for example, a data word, which is bounded by the control characters may be selected from the existing control character set. At least a first lane and a last lane of at least one column of the multilane communication channel may be encoded with the control characters selected from the existing control character set. The expanded control character may utilize spare link bandwidth. The existing control characters may be one of a configuration character, an idle character and an encapsulation character.

Another embodiment of the invention may provide a machine-readable storage, having stored thereon, a computer program having at least one code section for encoding data in a multilane communication channel. The at least one code section may be executable by a machine, thereby causing the machine to perform the steps for encoding data in a multilane communication channel as described above.

A further aspect of the invention provides a system for encoding data in a multilane communication channel. The system may include at least one generator which may generate from existing control characters in a character set, expanded control characters utilized for controlling the data in each lane of the multilane communication channel. At least one controller may control at least one of the lanes of the multilane communication channel using at least one of the generated control characters. A selector may select a second control character from any other of the existing control characters if a first control character of the existing control characters is an alignment character. A combiner may combine the first control character with the second control character to generate a third control character. Each of the combination of the combined first control character and the second control character may represent the expanded control character. An assignor may assign a first logic level to the first control character and to assign a second logic level to the second control character. The first logic level and the second logic level is one of logic zero (0) and logic (1).

In another aspect of the invention, the selector may select a second control character from any other of the existing control characters if a first control character of the existing control characters is a start-of-packet control character. The selected second control character may indicate the start of a packet. The controller may place the second control character in a first lane of the multilane communication channel. The controller may also determine which lane of the multilane communication channel contains an end-of-packet control character.

The selector may select at least one other control character from the existing control character set if the end-of-packet control character is preceded by at least one control character in a lane of the multilane communication channel. An encoder may encode the selected at least one other control character as the end-of-packet control character. The selector may also select at least one other control character from the existing control character set if the end-of-packet control character is succeeded by at least one comma control character in a lane of the multilane communication channel. The encoder may encode the selected control character as the comma control character. The generator may generate combinations of the encoded control character. The assignor may assign a unique value to each of the generated combinations of the encoded control character. Each of the assigned unique values may represent an expanded control character.

In another aspect of the invention, the controller may determine at least one lane of the multilane communication channel that has an inter-packet-gap control character. The selector may select any combination of control characters from the existing control character set. The encoder may encode a column of the multilane communication channel corresponding to the determined lane with the selected any combination of control characters. The generator may generate at least one column bearing, for example, a data word, bounded by control characters selected from the existing control character set. The encoder may encode at least a first lane and a last lane of at least one column of the multilane communication channel with the control characters selected from the existing control character set.

In accordance with the various embodiments of the invention, the expanded control character may utilize spare link bandwidth. The existing control characters may be a configuration character, an idle character or an encapsulation character, for example.

These and other advantages, aspects and novel features of the present invention, as well as details of a illustrated embodiment thereof, will be more fully understood from the following description and drawings.

DETAILED DESCRIPTION OF THE INVENTION

Certain embodiments of the present invention relate to exploiting spare link bandwidth in a multi-lane communication channel, using an enhanced encoding method, to effectively expand the utilized information capacity of the multilane communication channel. Accordingly, aspects of the invention may include a method for encoding data in a multilane communication channel. The method may include generating from existing control characters in a character set, an expanded control character which may be utilized for controlling data in each lane of the multilane communication channel. The expanded control character may utilize spare link bandwidth. At least one of the lanes may be controlled using at least one of the generated existing control characters. If a first control character is an alignment character, a second control character may be selected from any other existing control characters. The first control character may be combined with the second control character to generate a third control character. Each of the combinations of the first and second control characters may represent an expanded control character. The existing control characters may be a configuration character, an idle character or an encapsulation character.

Figure 1:
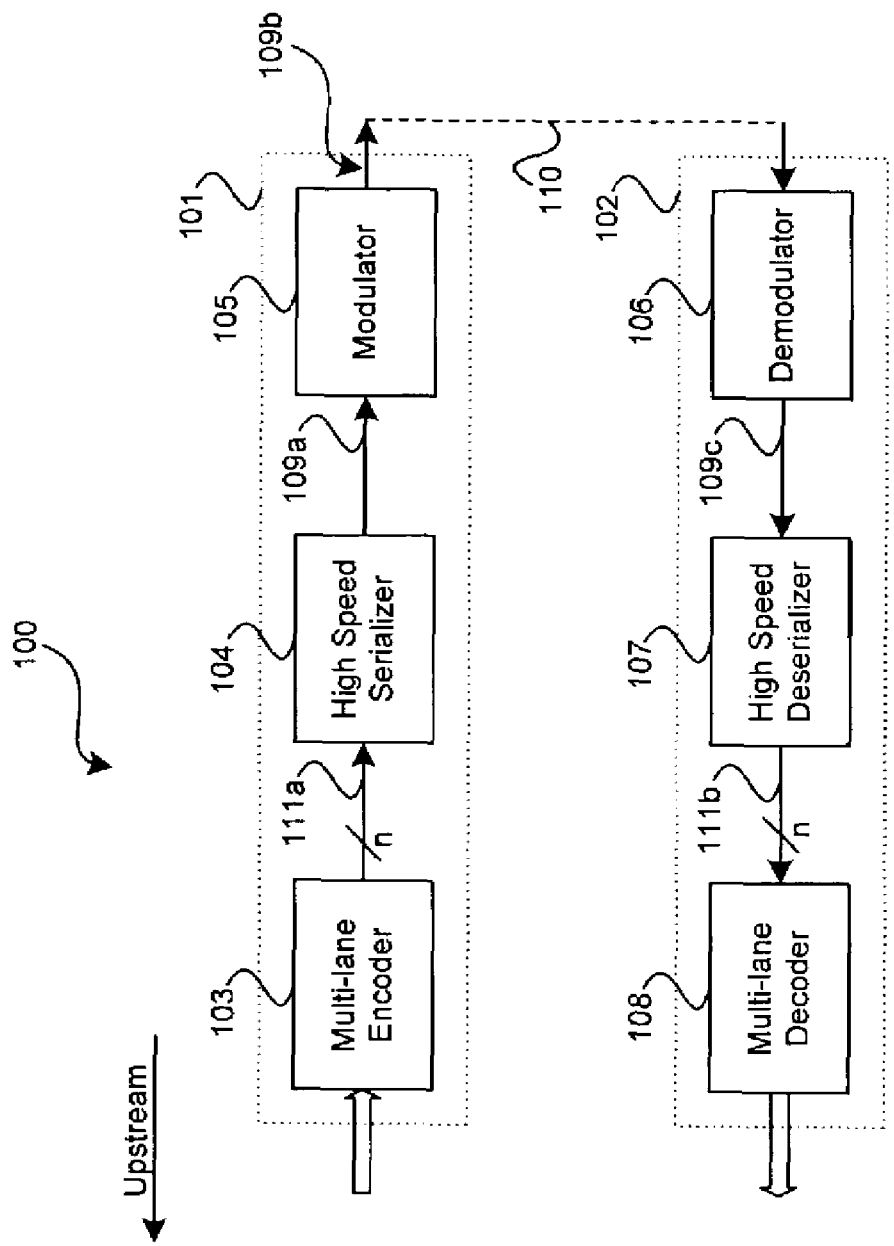
FIG. 1 is a diagram illustrating an embodiment of a current multilane digital communication link.
Figure 2:
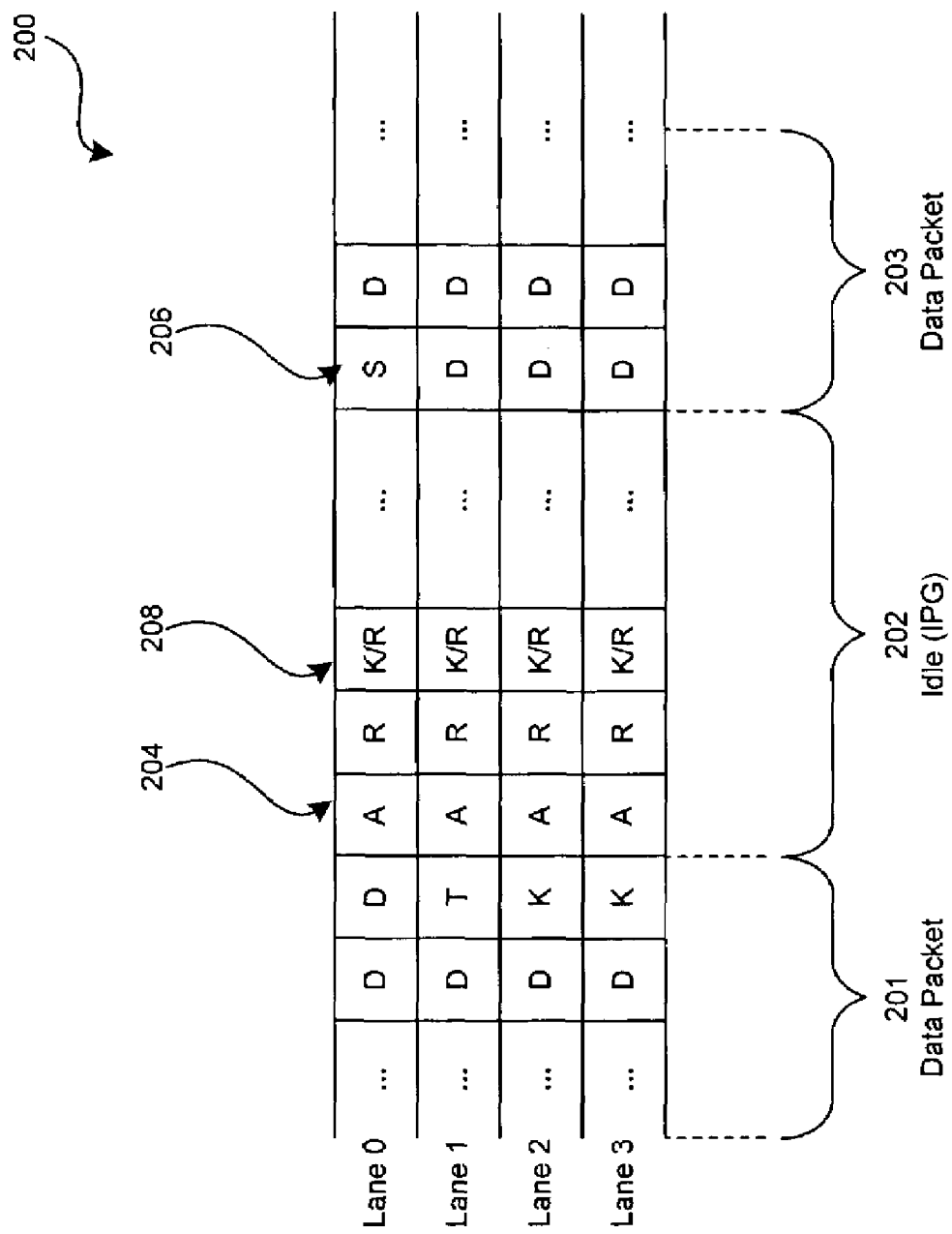
FIG. 2 is a diagram that illustrates an example of a XAUI parallel lane structure 200 for 10 gigabit (10 G) BASE-X operation comprising four lanes.
Figure 3:
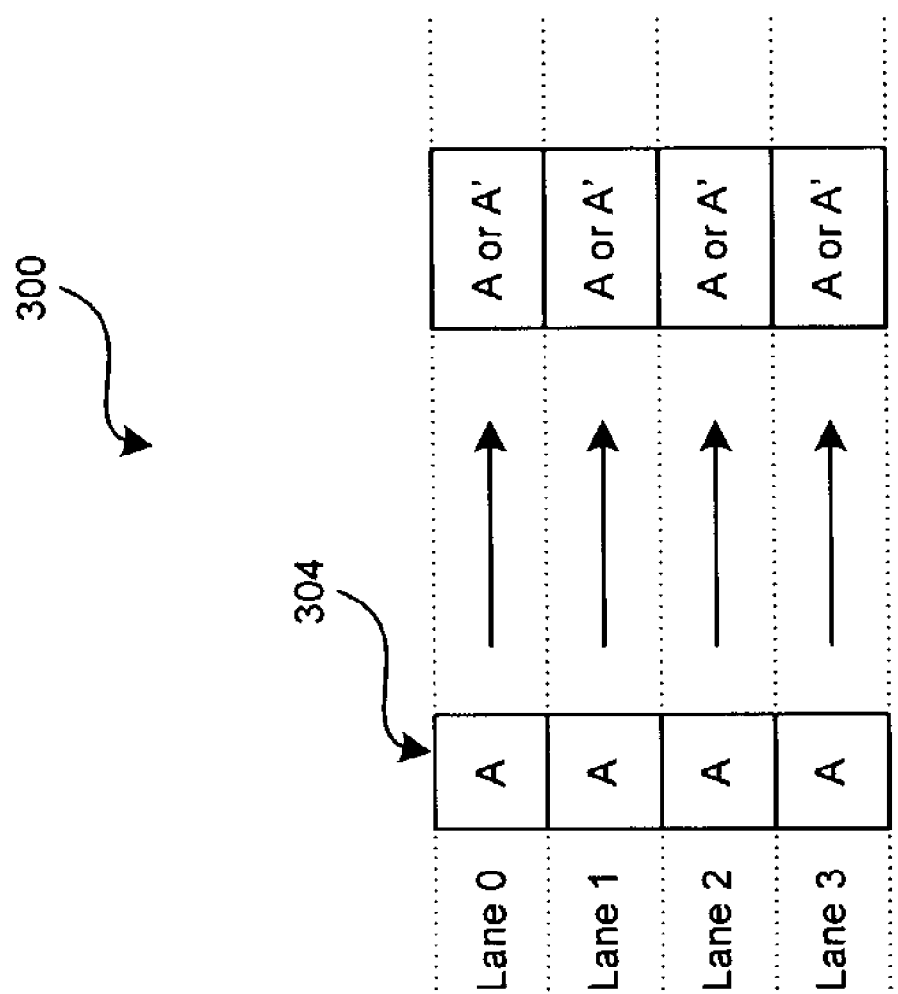
FIG. 3 is a diagram illustrating an embodiment of an enhanced encoding method specifically showing the encoding of lane alignment control characters /A/, in accordance with an embodiment of the invention.

FIG. 3 is a diagram 300 illustrating an embodiment of an enhanced encoding method specifically showing the encoding of lane alignment control characters /A/, in accordance with an embodiment of the invention. The lane alignment control character /A/ is a character that may appear in each of the lanes of a multi-lane transmission. The lane alignment control character /A/ may be utilized to align the parallel lanes with each other. In the case of a XAUI, the lane alignment control character may be utilized to align each of lane 0, lane 1, lane 2 and lane 3 with each other. Referring to FIG. 2, reference 204 illustrates an exemplary lane alignment characters in each of the XAUI lanes, lane 0, lane 1, lane 2 and lane 3.

In an embodiment of the invention, the lane alignment control character may not be limited to the /A/ control character. Accordingly, the protocol may include a lane alignment character that may have at least two control characters. In this regard, the lane alignment character /A/ may be combined with a second control character and the combined control characters may be utilized for lane alignment. For example, in a case where a second lane alignment character such as /A'/ is utilized, then the /A/ and /A'/ characters may be simultaneously utilized for lane alignment. The /A'/ control character may be any one of the other available control characters in the protocol.

In order to add encoded information, the control character /A/ may represent logic "1" and the control character /A'/ may represent logic "0". As a result, the two control characters /A/ and /A'/ may be utilized for lane alignment and as four additional bits of information that may be transmitted. Accordingly, the /A/ and the /A'/ control characters may utilize spare link bandwidth. The following table illustrates possible combinations for the control characters /A/, /A'/ for a XAUI.

|    | LANE 0 | LANE 1 | LANE 2 | LANE 3 |
|----|--------|--------|--------|--------|
| 0  | /A/    | /A/    | /A/    | /A/    |
| 1  | /A/    | /A/    | /A/    | /A'/   |
| 2  | /A/    | /A/    | /A'/   | /A/    |
| 3  | /A/    | /A/    | /A'/   | /A'/   |
| 4  | /A/    | /A'/   | /A/    | /A/    |
| 5  | /A/    | /A'/   | /A/    | /A'/   |
| 6  | /A/    | /A'/   | /A'/   | /A/    |
| 7  | /A/    | /A'/   | /A'/   | /A'/   |
| 8  | /A'/   | /A/    | /A/    | /A/    |
| 9  | /A'/   | /A/    | /A/    | /A'/   |
| 10 | /A'/   | /A/    | /A'/   | /A/    |
| 11 | /A'/   | /A/    | /A'/   | /A'/   |
| 12 | /A'/   | /A'/   | /A/    | /A/    |
| 13 | /A'/   | /A'/   | /A/    | /A'/   |
| 14 | /A'/   | /A'/   | /A'/   | /A/    |
| 15 | /A'/   | /A'/   | /A'/   | /A'/   |

For Example, if the lane alignment characters transmitted in each lane are, lane 0: /A'/, lane 1: /A/, lane 2: /A/ and lane 3: /A'/, this may represent the four (4) bits of information 0, 1, 1, 0. With four (4) bits, there are $2^4$ or 16 possible combinations that may be encoded, each of which may be utilized to represent a different unit of information. In one aspect of the invention, the four (4) bits of lane alignment control characters may be encoded in order to transmit status information or other system information, for example. The following table illustrates exemplary logic assignments for various combinations of control characters /A/, /A'/ for a XAUI as described in the table above.

|    | LANE 0 | LANE 1 | LANE 2 | LANE 3 |
|----|--------|--------|--------|--------|
| 0  | 1 | 1 | 1 | 1 |
| 1  | 1 | 1 | 1 | 0 |
| 2  | 1 | 1 | 0 | 1 |
| 3  | 1 | 1 | 0 | 0 |
| 4  | 1 | 0 | 1 | 1 |
| 5  | 1 | 0 | 1 | 0 |
| 6  | 1 | 0 | 0 | 1 |
| 7  | 1 | 0 | 0 | 0 |
| 8  | 0 | 1 | 1 | 1 |
| 9  | 0 | 1 | 1 | 0 |
| 10 | 0 | 1 | 0 | 1 |
| 11 | 0 | 1 | 0 | 0 |
| 12 | 0 | 0 | 1 | 1 |
| 13 | 0 | 0 | 1 | 0 |
| 14 | 0 | 0 | 0 | 1 |
| 15 | 0 | 0 | 0 | 0 |

The first exemplary combination or encoding, namely 0, which has lane 0: /A/, lane 1: /A/, lane 2: /A/ and lane 3: /A/ may represent the standard assignment for lane alignment. However, the remaining encoded combinations, namely 1 through 15, may represent expanded or additional assignments that may be utilized for communicating status or other system information.

Figure 4:
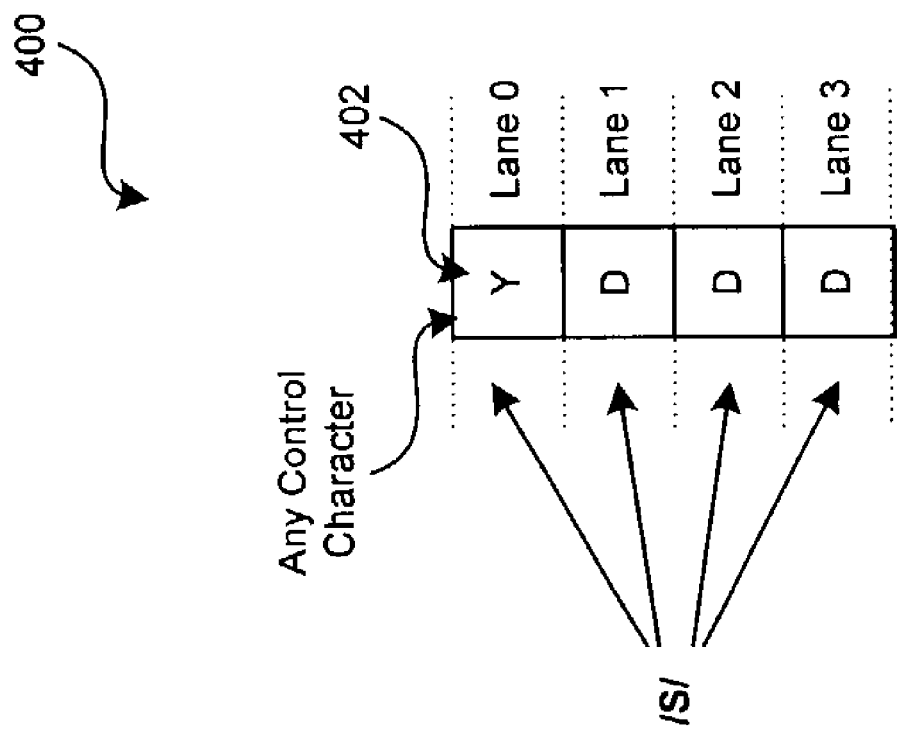
FIG. 4 is a diagram illustrating an embodiment of the enhanced encoding method of FIG. 3 specifically showing the encoding of a start-of-packet control character /S/ in accordance an embodiment of the present invention.

In another embodiment of the invention, a start-of-packet (SOP) control character, which may be represented as a /S/ control character, may also be encoded. FIG. 4 is a diagram 400 illustrating an embodiment of the enhanced encoding method of FIG. 3 specifically showing the encoding of a start-of-packet control character /S/ in accordance an embodiment of the present invention. The start-of-packet control character /S/, may normally appear in lane 0 of a multilane communication channel structure. The start-of-packet control character /S/, may be utilized to signify the start of a next data packet, symbol or codeword by itself. Referring to FIG. 2, reference 206 depicts a start-of-packet control character /S/.

In one embodiment of the invention, any control character in an existing control character set may be utilized to define an expanded or new start-of-packet control character that may represent the start of a next packet. Referring to FIG. 4, the expanded or new start-of-packet character may be represented by /Y/, for example. The expanded or new start-of-packet control character is referenced by 402. The expanded or new start-of-packet control character 402 may represent the start of a new packet and may be located or placed in the first lane, lane 0. The expanded start-of-packet control character 402 may be succeeded by or followed by data words, /D/, in each of the successive lanes, lane 1, lane 2 and lane 3. As a result, each unique control character /Y/ in a start-of-packet lane sequence may represent a different unit of information. For example, if there are 12 control characters in the control character set, then 11 additional units of information may be communicated as part of a start-of-packet control character. Notwithstanding, the additional units of information or expanded start-of-packet control characters may utilize spare link bandwidth.

Figure 5:
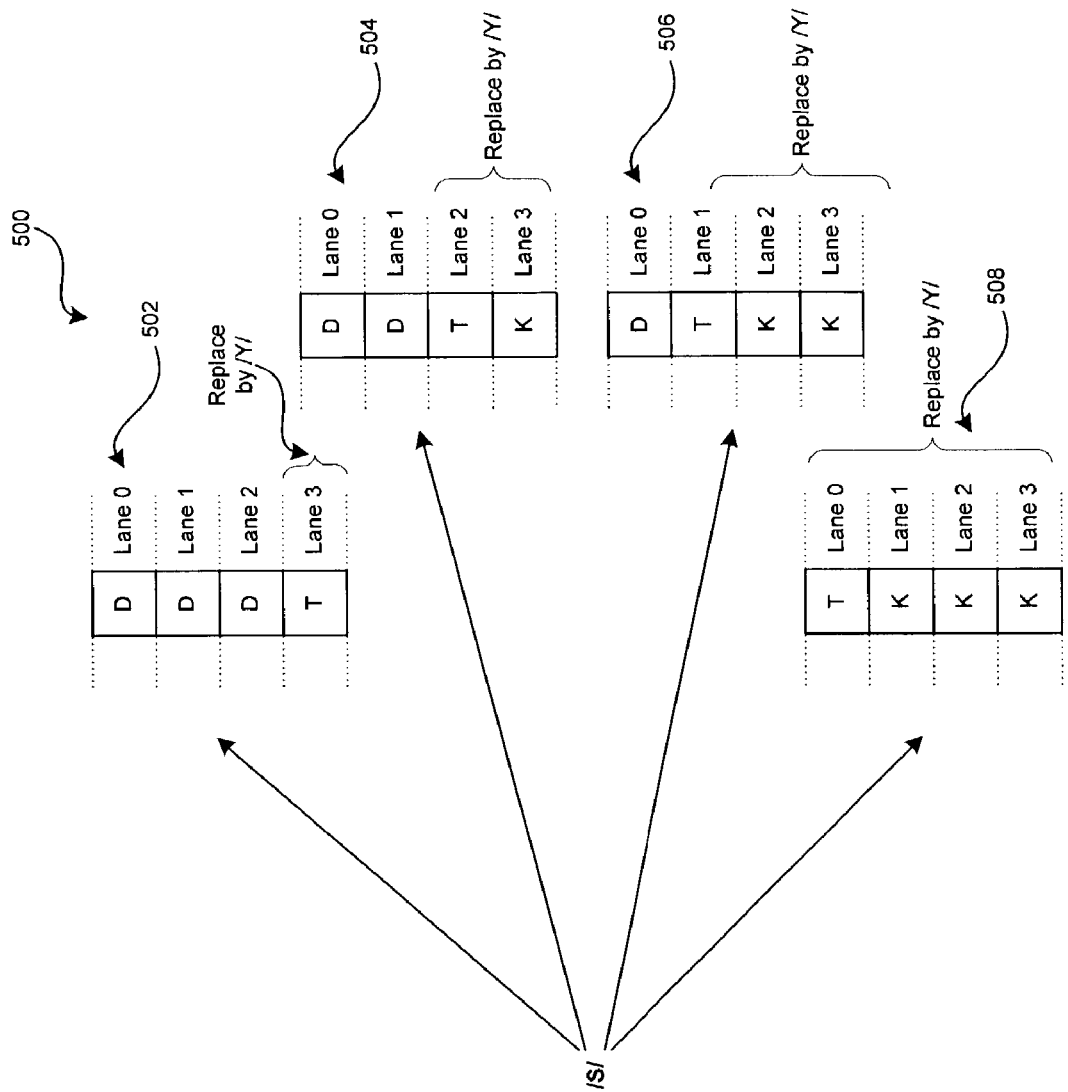
FIG. 5 is a diagram illustrating an embodiment of the enhanced encoding method of FIG. 3 specifically showing the encoding of an end-of-packet control character /T/, in accordance with an embodiment of the present invention.

In another embodiment of the invention, an end-of-packet (EOP) control character, which may be represented as a /T/ control character, may also be encoded. FIG. 5 is a diagram 500 illustrating an embodiment of the enhanced encoding method of FIG. 3 specifically showing the encoding of an end-of-packet control character /T/, in accordance with an embodiment of the present invention. The end-of-packet control character /T/, may appear in any lane of a multi-lane structure and may be preceded by data words /D/ and/or followed by comma control characters /K/. The end-of-packet control character /T/ may also be utilized to define the end of a current data packet, symbol or control word all by itself. Although /T/ and /K/ control characters are illustrated in FIG. 5, the invention is not so limited and any other control characters in the existing control character set may be utilized.

In accordance with an aspect of the invention, whenever an end-of-packet control character is preceded by data words /D/, subsequent end-of-packet control characters /T/ and/or comma control characters /K/ may be encoded as any available control character such as /Y/. For example, referring to FIG. 5, in a case where there are four (4) lanes and the end-of-packet sequence would be lane 0: /D/, lane 1: /D/, lane 2: /D/, and lane 3: /T/, as referenced by 502, then the /T/ in lane 3 may be encoded as any available control character /Y/. This may result in expanded or additional control characters that may provide additional units of information, which communicates status or other system information. The additional units of information or expanded end-of-packet control characters may utilize spare link bandwidth.

Similarly, in instances where the end-of-packet sequence would be lane 0: /D/, lane 1: /D/, lane 2: /T/ and lane 3: /K/, as referenced by 504, then the /T/ control character in lane 2 and the control character /K/ in lane 3 may be encoded with any combination of available control characters. This may result in expanded or additional control characters and may provide additional units of information that communicates status or other system information. The additional units of information or expanded end-of-packet control characters may utilize spare link bandwidth.

Additionally, in instances where the end-of-packet sequence would be lane 0: D, lane 1: /T/, lane 2: /K/ and lane 3: /K/, as referenced by 506, then the /T/ control character in lane 1, the /K/ control character in lane 2, and the /K/ control character in lane 3 may be encoded with any combination of available control characters. In this regard, the sequence of two (2) /K/ control characters in lane 2 and lane 3 may be encoded as two (2) bits of additional information. For example, the two (2) /K/ control characters may be encoded as /K/ or /K'/ where /K'/ is a different control character from /K/ and may be one of the control characters in the existing control character set. In this manner, the /K/ control character may represent logic one (1) and the /K'/ may represent logic zero (0), thereby providing 2 bits of additional information in the EOP sequence. This may result in expanded or additional control characters and may provide additional units of information that communicates status or other system information. The additional units of information or expanded end-of-packet control characters may utilize spare link bandwidth.

Finally, in instances where the end-of-packet sequence would be lane 0: /T/, lane 1: /K/, lane 2: /K/ and lane 3: /K/, as referenced by 508, then the sequence of three (3) /K/ control characters in lane 1, lane 2 and lane 3 may be encoded as three (3) bits of additional information. Again, this may result in expanded or additional control characters and may provide additional units of information that communicates status or other system information. The additional units of information or expanded end-of-packet control characters may utilize spare link bandwidth. For example, the three (3) /K/ control characters may be encoded as /K/ or /K'/ where /K'/ is a different control character from /K/ and may be one of the control characters in the existing control character set. In this manner, the /K/ control character may represent logic one (1) and the /K'/ may represent logic zero (0), thereby providing 3 bits of additional information in the EOP sequence. Other encoding schemes for this EOP sequence may be implemented without departing from the spirit or essence of the various embodiments of the present invention.

Figure 6:
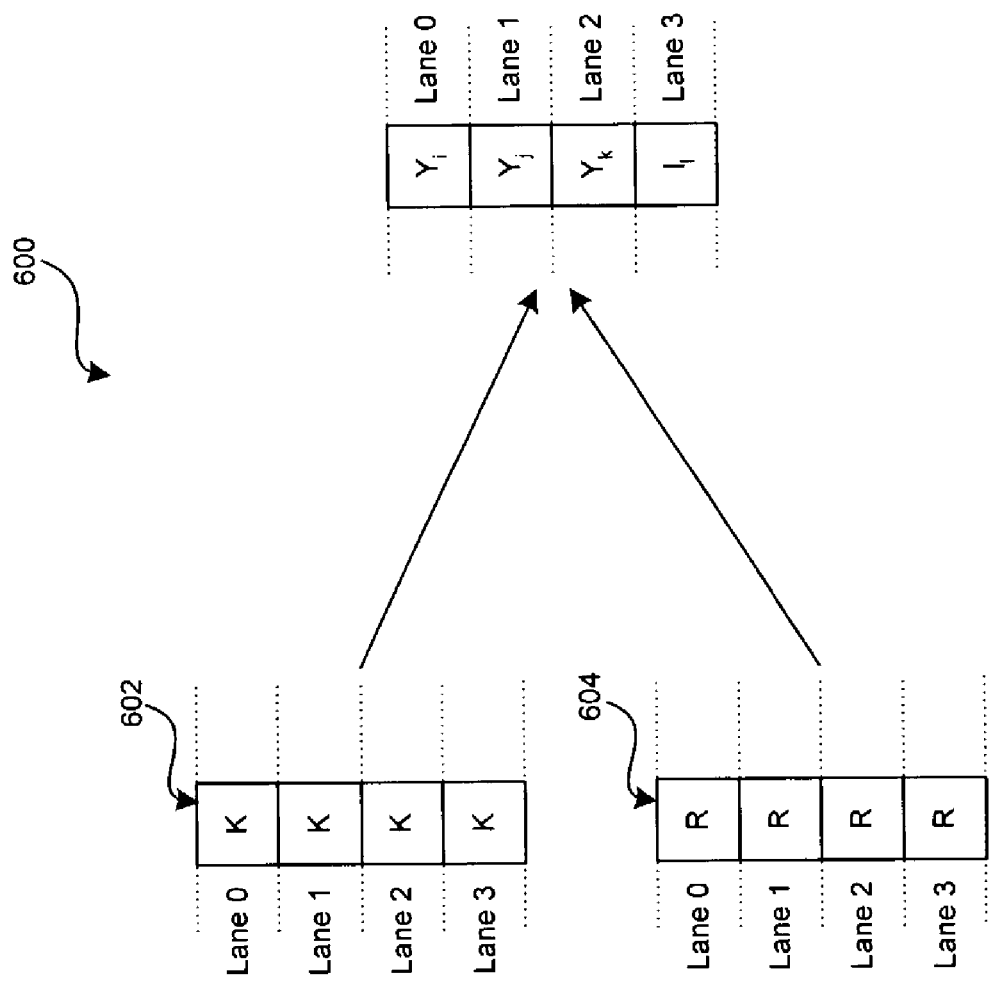
FIG. 6 is a diagram illustrating an embodiment of the enhanced encoding method of FIG. 3 specifically showing the encoding of control characters in an inter-packet-gap, in accordance with and embodiment of the invention.

Another embodiment of the invention may provide encoding of control characters in an idle or inter packet gap (IPG). FIG. 6 is a diagram 600 illustrating an embodiment of the enhanced encoding method of FIG. 3 specifically showing the encoding of control characters in an inter-packet-gap, in accordance with an embodiment of the invention. An inter-packet-gap or idle control character may occur between two data packets in a multilane communication channel. The inter-packet-gap may include comma control characters /K/ and carrier extend control characters /R/. In general, the inter-packet-gap control characters may be the same in any given column of a parallel multilane channel structure. Referring to FIG. 2, reference 208 depicts an idle or inter-packet-gap control character.

Within an inter-packet-gap, a column of control characters across the parallel lanes of a multilane communication channel may be encoded using any combination of available control characters such as /Y/ in accordance with an embodiment of the invention. This may result in expanded or additional inter-packet-gap control characters and may provide additional units of information that communicates status or other system information. The additional units of information or expanded inter-packet-gap control characters may utilize spare link bandwidth. In a further aspect of the invention, multiple columns of control characters within an inter-packet-gap may also be encoded in a similar manner to add even more information to the inter-packet-gap.

Referring to FIG. 6, a column containing /K/ control characters 602, which may represent an inter-packet-gap or idle control character, may be encoded using any combination of control characters in the control character set. In this regard, /Y/ may represent a selected control character from the control character set. Possible combinations of the selected control character /Y/ may be represented by $/Y_i/, /Y_j/, /Y_k/$ and $/Y_l/$. Similarly, a column containing /R/ control characters 604, which may represent an inter-packet-gap or idle control character, may be encoded using any combination of control characters in the control character set. Accordingly, the /R/ control characters may be encoded using any possible combinations and may be represented by $/Y_i/, /Y_j/, /Y_k/$ and $/Y_l/$.

Figure 7:
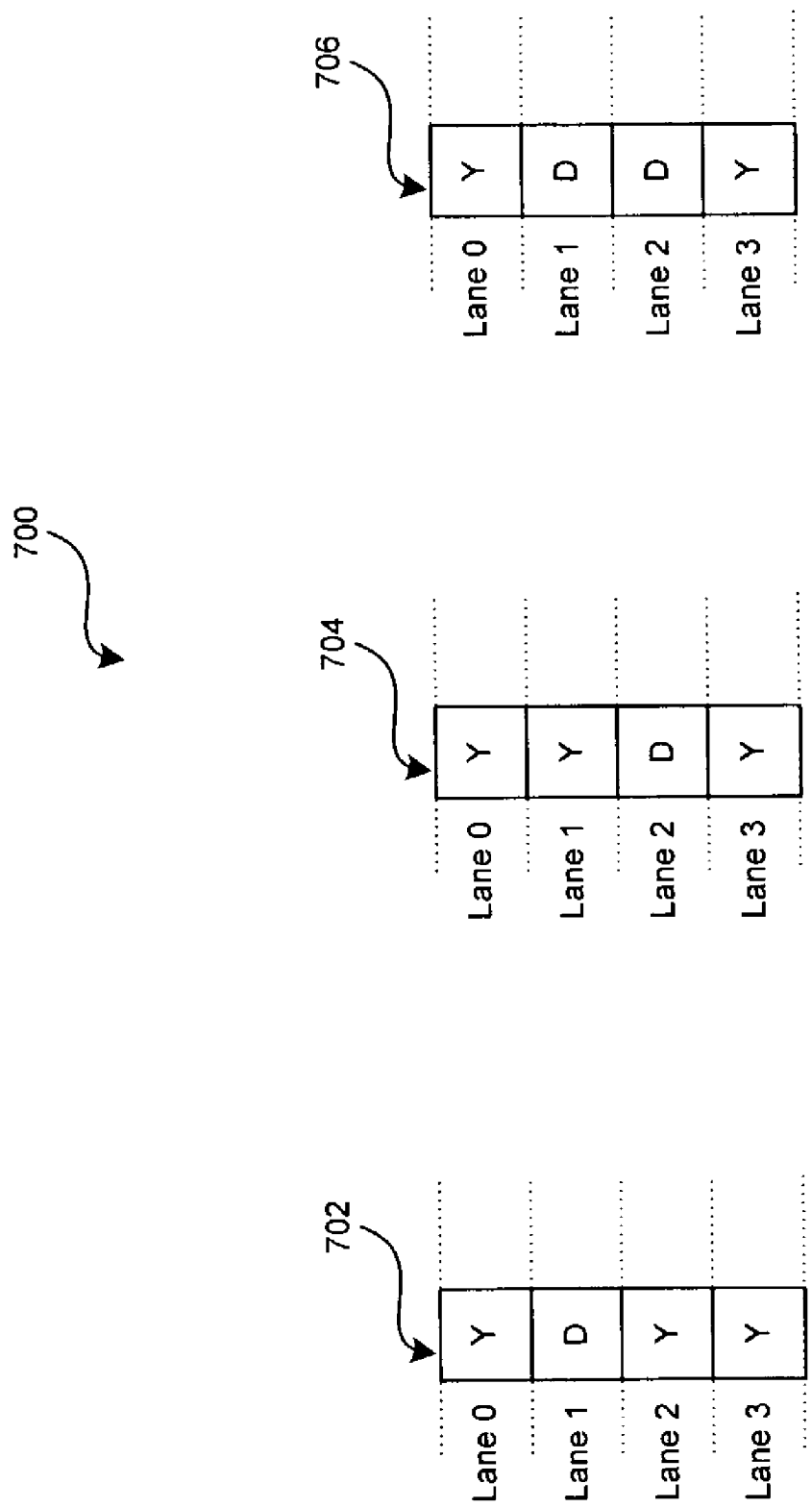
FIG. 7 is a diagram illustrating an embodiment of the enhanced encoding method of FIG. 3 specifically showing the encoding of data words bounded by control characters, in accordance with an embodiment of the invention.

Another embodiment of the invention may include the creation or generation of new columns of control characters, data words, codewords and/or symbols, which may be placed in a multilane communication channel. FIG. 7 is a diagram 700 illustrating an embodiment of the enhanced encoding method of FIG. 3 specifically showing the encoding of data words bounded by control characters, in accordance with an embodiment of the invention. In FIG. 7, newly created columns of control characters /Y/ and data words /D/ may be inserted into a multilane datastream for a communication channel.

Referring to FIG. 7, three (3) exemplary configuration columns 702, 704 and 706, of data words /D/ bounded by control characters /Y/ are illustrated. Expanded information may be encoded in the data words /D/ and may be bounded by control characters /Y/. The control characters /Y/ may be any combination of control characters in the control character set. Certain configurations of control characters /Y/ and data words /D/ may define specific types of communicated information. Accordingly, this may result in additional control characters and may provide additional units of information that may communicates status or other system information. The additional units of information or expanded control characters may utilize spare link bandwidth.

For example, configuration column 702 illustrates lane 0: /Y/, lane 1: /D/, lane 2: /Y/ and lane 3: Y and configuration column 704 illustrates lane 0: /Y/, lane 1: /Y/, lane 2: /D/ and lane 3: /Y/. The configuration column 706 having lane 0: /Y/, lane 1: /D/, lane 2: /D/ and lane 3: /Y/ may be generated to represent two bytes of status information such as error information. If each data word /D/ is 8 bits, for example, then each /D/ may be encoded to provide up to $2^8$ or 256 different units of information. The newly encoded configuration columns 702, 704 and 706 illustrate /D/ data words bounded by control characters /Y/. The new columns of added information may be inserted in the parallel lane structure of a multilane channel. In this regard, the new columns and added information may be inserted within data packets and/or within inter-packet-gaps, for example. The insertion of new columns of added information may result in the additional bytes being added to the parallel datastream in the multilane channel. However, the additional bytes are added to the parallel data stream such that the additional information that is carried by the additional bytes out weighs the overhead associated with the additional bytes.

Other embodiments that may take advantage of spare link bandwidth, may also be implemented. For example, the /K/ control character may comprise seven (7) fixed bits and three (3) don't care bits (xxx) according to 8B/10B encoding protocol, thereby resulting in a codeword of 0011111xxx. The protocol may be modified such that the three (3) don't care bits xxx, may be encoded with $2^3$ or 8 different units of additional information in accordance with an embodiment of the present invention. Notwithstanding, although a XAUI is utilized to illustrate various embodiment or aspects of the invention, the enhanced encoding methods are applicable to other encoding schemes that may utilize multiple lanes, in accordance with various embodiments of the present invention.

Figure 8:
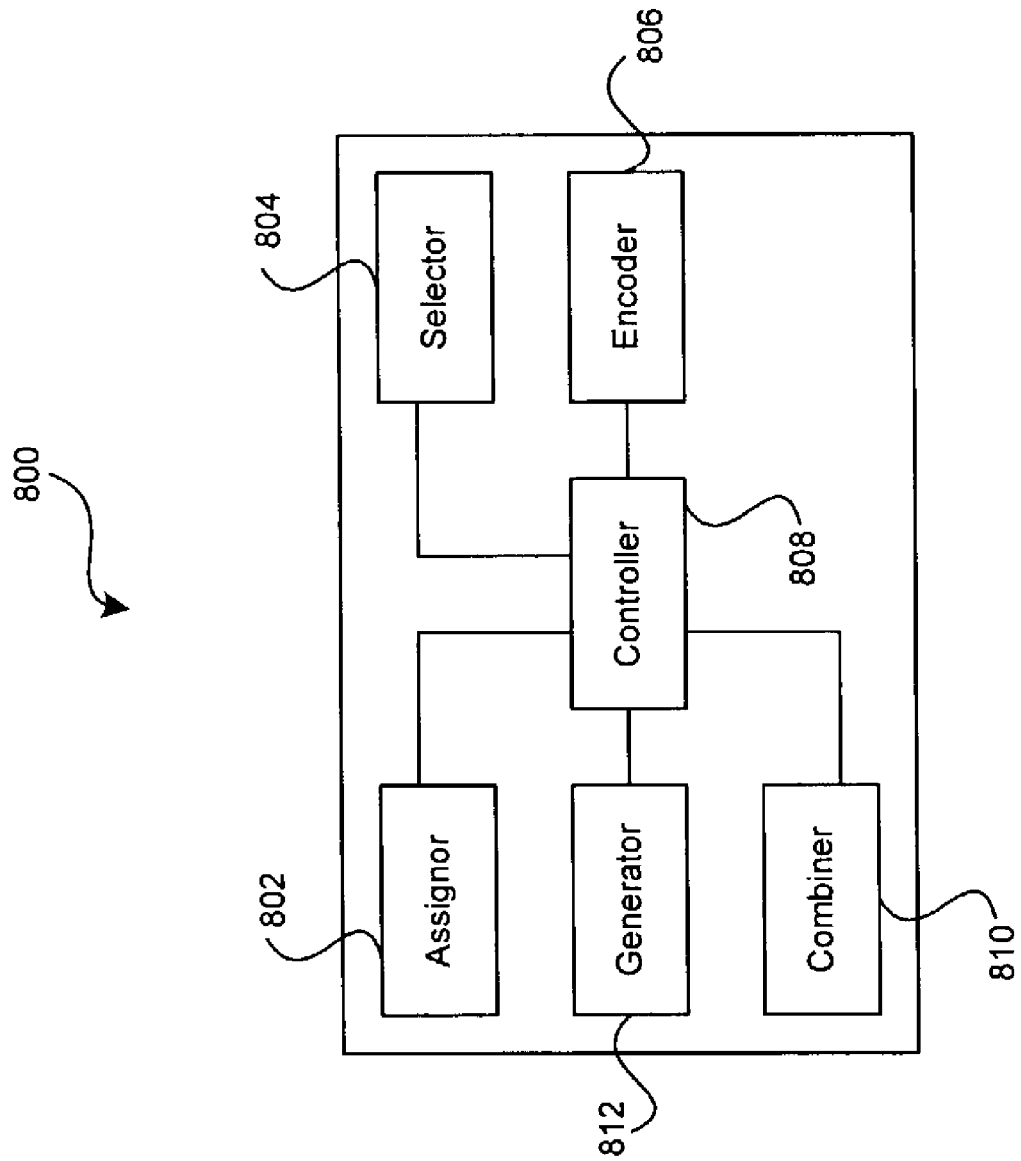
FIG. 8 is a block diagram of an exemplary system 800 for encoding data in a multilane communication channel in accordance with an embodiment of the invention.

FIG. 8 is a block diagram of an exemplary system 800 for encoding data in a multilane communication channel in accordance with an embodiment of the invention. The system 800 may include an assignor 802, a selector 804, an encoder 806, a controller 808, a combiner 810 and a generator 812. Referring to FIG. 8, the generator 812 may generate from existing control characters in a character set, expanded control characters utilized for controlling the data in each lane of the multilane communication channel. The controller 808 may control at least one of the lanes of the multilane communication channel using at least one of the generated control characters. The selector 804 may select a second control character from any other of the existing control characters if a first control character of the existing control characters is an alignment character. The combiner 810 may combine the first control character with the second control character to generate a third control character. Each of the combination of the combined first control character and the second control character may represent the expanded control character. The assignor 802 may assign a first logic level to the first control character and to assign a second logic level to the second control character. The first logic level and the second logic level is one of logic zero (0) and logic (1).

In another aspect of the invention, the selector 804 may select a second control character from any other of the existing control characters if a first control character of the existing control characters is a start-of-packet control character. The selected second control character may indicate the start of a packet. The controller 808 may place the second control character in a first lane of the multilane communication channel. The controller 808 may also determine which lane of the multilane communication channel contains an end-of-packet control character.

The selector 804 may select at least one other control character from the existing control character set if the end-of-packet control character is preceded by at least one control character in a lane of the multilane communication channel. The encoder 806 may encode the selected at least one other control character as the end-of-packet control character. The selector 804 may select at least one other control character from the existing control character set if the end-of-packet control character is succeeded by at least one comma control character in a lane of the multilane communication channel. The encoder 806 may encode the selected control character as the comma control character. The generator 812 may generate combinations of the encoded control character. The assignor 802 may assign a unique value to each of the generated combinations of the encoded control character. Each of the assigned unique value may represent an expanded control character.

In another aspect of the invention, the controller 808 may determine at least one lane of the multilane communication channel that has an inter-packet-gap control character. The selector 804 may select any combination of control characters from the existing control character set. The encoder 806 may encode a column of the multilane communication channel corresponding to the determined lane with the selected any combination of control characters. The generator 812 may generate at least one column bearing, for example a data word, bounded by control characters selected from the existing control character set. The encoder 806 may encode at least a first lane and a last lane of at least one column of the multilane communication channel with the control characters selected from the existing control character set. In accordance with the various embodiments of the invention, the expanded control character may utilizing spare link bandwidth. The existing control characters may be a configuration character, an idle character or an encapsulation character, for example.

In another embodiment of the invention, the /S/ control character may be further employed to utilize unused bandwidth. In this regard, the /S/ control character may not be limited to lane 0, but may be utilized in other lanes as well. For example, in a four (4) lane XAUI arrangement, the /S/ control character may occur in lanes 1, 2 and/or 3. Accordingly, in the four (4) lane XAUI system, there would be two (2) additional bits of information that may be passed depending on the lane in which lane the /S/ control character is located. For example, lane 0 may be represented by binary 00, lane 1 by binary 01, lane 2 by binary 10 and lane 3 by binary 11.

In summary, a method is provided that exploits spare link bandwidth in a multi-lane communication channel using an enhanced encoding scheme, to effectively expand the utilized information capacity of a multilane communication channel. Existing control character protocol may be enhanced to permit the embedding of additional information in the multilane communication channel. The additional information may include various system and status information.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for encoding data in a multilane communication channel, the method comprising:

generating, from existing control characters in a character set, expanded control characters utilized for controlling the data in each lane of the multilane communication channel, wherein each lane of the multilane communication channel transports the data in a similar direction;

controlling at least one of said lanes of the multilane communication channel using at least one of said generated control characters; and if a first control character of said existing control characters is a start-of-packet control character, selecting a second control character from any other of said generated expanded control characters; and indicating a start of a packet using said selected second control character for at least one of said lanes.

2. The method according to claim 1, comprising placing said second control character in a first lane of the multilane communication channel.

3. A method for encoding data in a multilane communication channel, the method comprising:

generating, from existing control characters in a character set, expanded control characters utilized for controlling the data in each lane of the multilane communication channel, wherein each lane of the multilane communication channel transports the data in a similar direction;

controlling at least one of said lanes of the multilane communication channel using at least one of said generated control characters; and determining which lane of the multilane communication channel contains an end-of-packet control character.

4. The method according to claim 3, comprising:

if said end-of-packet control character is preceded by at least one control character in a lane of the multilane communication channel, selecting at least one other control character from said existing control character set; and encoding said selected at least one other control character as said end-of-packet control character.

5. The method according to claim 3, comprising:

if said end-of-packet control character is succeeded by at least one comma control character in a lane of the multilane communication channel, selecting at least one other control character from said existing control character set; and encoding said selected at least one other control character as said comma control character.

6. The method according to claim 5, comprising generating combinations of said encoded at least one other character.

7. The method according to claim 6, comprising assigning a unique value to each of said generated combinations of said encoded at least one other control character.

8. The method according to claim 7, wherein each of said assigned unique values represents an expanded control character.

9. A method for encoding data in a multilane communication channel, the method comprising:
- generating, from existing control characters in a character set, expanded control characters utilized for controlling the data in each lane of the multilane communication channel, wherein each lane of the multilane communication channel transports the data in a similar direction;
- controlling at least one of said lanes of the multilane communication channel using at least one of said generated expanded control characters; and
- utilizing, during said controlling, spare link bandwidth by said generated expanded control character.

10. A machine-readable storage having stored thereon, a computer program having at least one code section for encoding data in a multilane communication channel, the at least one code section being executable by a machine for causing the machine to perform steps comprising:
- generating, from existing control characters in a character set, expanded control characters utilized for controlling the data in each lane of the multilane communication channel, wherein each lane of the multilane communication channel transports the data in a similar direction;
- controlling at least one of said lanes of the multilane communication channel using at least one of said generated control characters;
- selecting a second control character from any other of said generated expanded control characters, if a first control character of said existing control characters is a start-of-packet control character; and
- indicating a start of a packet using said selected second control character for at least one of said lanes.

11. The machine-readable storage according to claim 10, comprising code for placing said second control character in a first lane of the multilane communication channel.

12. A machine-readable storage having stored thereon, a computer program having at least one code section for encoding data in a multilane communication channel, the at least one code section being executable by a machine for causing the machine to perform steps comprising:
- generating from existing control characters in a character set, expanded control characters utilized for controlling the data in each lane of the multilane communication channel, wherein each lane of the multilane communication channel transports the data in a similar direction;
- controlling at least one of said lanes of the multilane communication channel using at least one of said generated control characters; and
- determining which lane of the multilane communication channel contains an end-of-packet control character.

13. The machine-readable storage according to claim 12, comprising:
- code for selecting at least one other control character from said existing control character set, if said end-of-packet control character is preceded by at least one control character in a lane of the multilane communication channel; and
- encoding said selected at least one other control character as said end-of-packet control character.

14. The machine-readable storage according to claim 12, comprising:
- code for selecting at least one other control character from said existing control character set, if said end-of-packet control character is succeeded by at least one comma control character in a lane of the multilane communication channel; and
- code for encoding said selected at least one other control character as said comma control character.

15. The machine-readable storage according to claim 14, comprising code for generating combinations of said encoded at least one other control character.

16. The machine-readable storage according to claim 15, comprising code for assigning a unique value to each of said generated combinations of said encoded at least one other control character.

17. The machine-readable storage according to claim 16, wherein each of said assigned unique values represents an expanded control character.

18. A machine-readable storage having stored thereon, a computer program having at least one code section for encoding data in a multilane communication channel, the at least one code section being executable by a machine for causing the machine to perform steps comprising:
- generating from existing control characters in a character set, expanded control characters utilized for controlling the data in each lane of the multilane communication channel, wherein each lane of the multilane communication channel transports the data in a similar direction;
- controlling at least one of said lanes of the multilane communication channel using at least one of said generated expanded control characters; and
- utilizing, during said controlling, spare link bandwidth by said generated expanded control character.

19. A system for encoding data in a multilane communication channel, the system comprising:
- a generator that generates from existing control characters in a character set, expanded control characters utilized for controlling the data in each lane of the multilane communication channel, wherein each lane of the multilane communication channel transports the data in a similar direction;
- a controller that controls at least one of said lane of the multilane communication channel using at least one of said generated control characters; and
- a selector that selects a second control character from any other of said generated expanded control characters, if a first control character of said existing control characters comprises a start-of-packet control character, wherein said selected second control character indicates a start of a packet for at least one of said lanes.

20. The system according to claim 19, comprising a controller that places said second control character in a first lane of the multilane communication channel.

21. A system for encoding data in a multilane communication channel, the system comprising:
- at least one generator that generates from existing control characters in a character set, expanded control characters utilized for controlling the data in each lane of the multilane communication channel, wherein each lane of the multilane communication channel transports the data in a similar direction; and
- at least one controller that controls at least one of said lane of the multilane communication channel using at least one of said generated control characters, wherein said at least one controller determines which lane of the multilane communication channel contains an end-of-packet control character.

22. The system according to claim 21, comprising:
- a selector that selects at least one other control character from said existing control character set, if said end-of-packet control character is preceded by at least one control character in a lane of the multilane communication channel; and
- an encoder that encodes said selected at least one other control character as said end-of-packet control character.

23. The system according to claim 21, comprising:
- a selector that selects at least one other control character from said existing control character set, if said end-of-packet control character is succeeded by at least one comma control character in a lane of the multilane communication channel; and
- an encoder that encodes said selected at least one other control character as said comma control character.

24. The system according to claim 23, wherein said at least one generator generates combinations of said encoded at least one other control character.

25. The system according to claim 24, comprising an assignor that assigns a unique value to each of said generated combinations of said encoded at least one other character.

26. The system according to claim 25, wherein each of said assigned unique values represents an expanded control character.

27. A system for encoding data in a multilane communication channel, the system comprising:
- a generator that generates from existing control characters in a character set, expanded control characters utilized for controlling the data in each lane of the multilane communication channel, wherein each lane of the multilane communication channel transports the data in a similar direction; and
- a controller that controls at least one of said lane of the multilane communication channel using at least one of said generated control characters, wherein said generated expanded control characters utilize, during said controlling, spare link bandwidth.

* * * * *